J. S. FORBES.
APPARATUS FOR HEATING WATER, MILK, AND OTHER LIQUIDS FOR STERILIZING OR OTHER PURPOSES.
APPLICATION FILED AUG. 10, 1908.
973,270.
Patented Oct. 18, 1910.
2 SHEETS—SHEET 1.
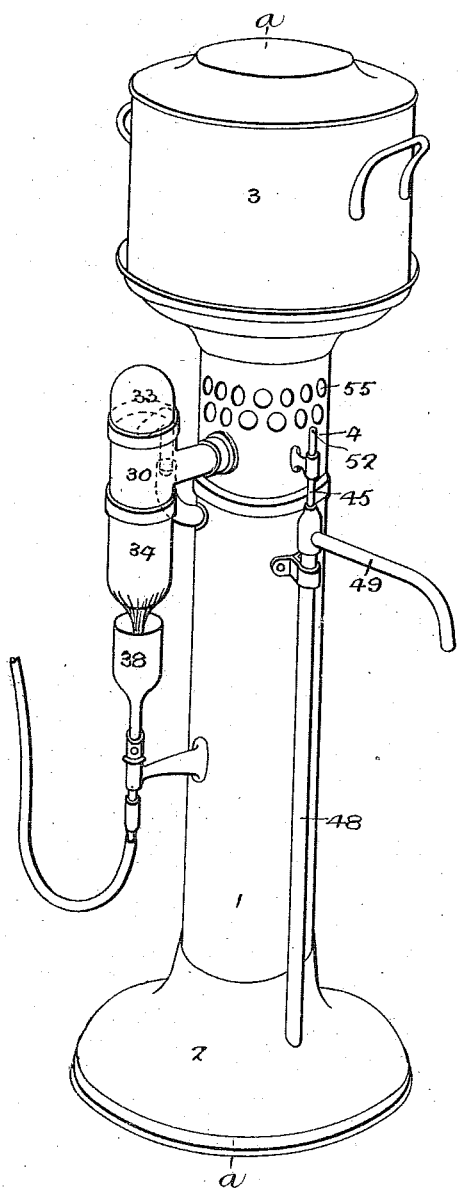
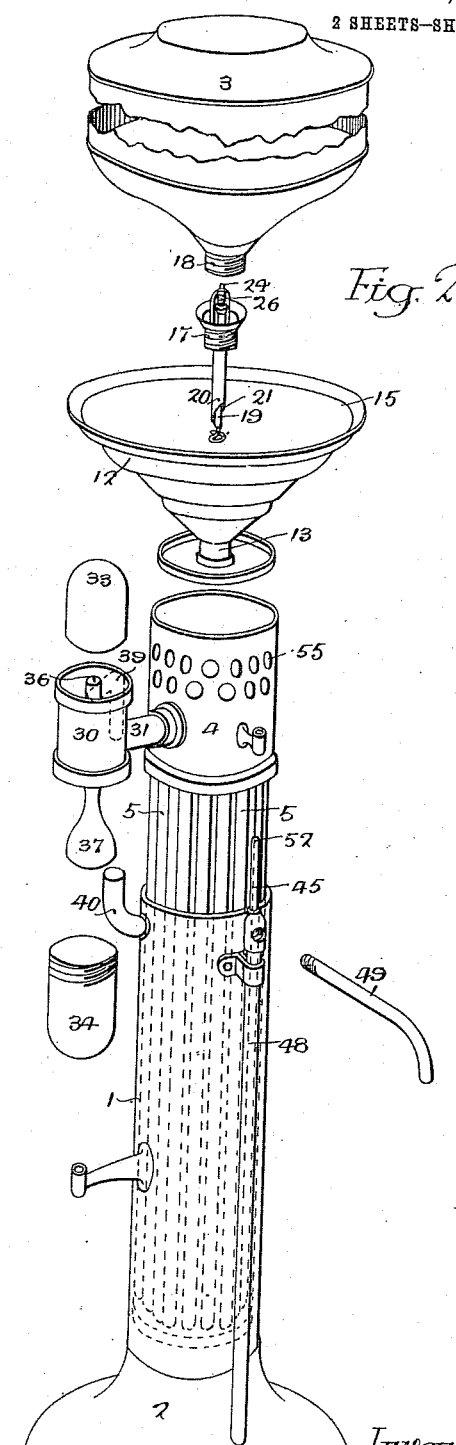
Witnesses:
William H. Rivoir
Willa A. Burrows
Inventor
John S. Forbes.
by his Attorneys
Howson & Howson J. S. FORBES.
APPARATUS FOR HEATING WATER, MILK, AND OTHER LIQUIDS FOR STERILIZING OR OTHER PURPOSES.
APPLICATION FILED AUG. 10, 1908.
973,270.
Patented Oct. 18, 1910.
2 SHEETS—SHEET 2.
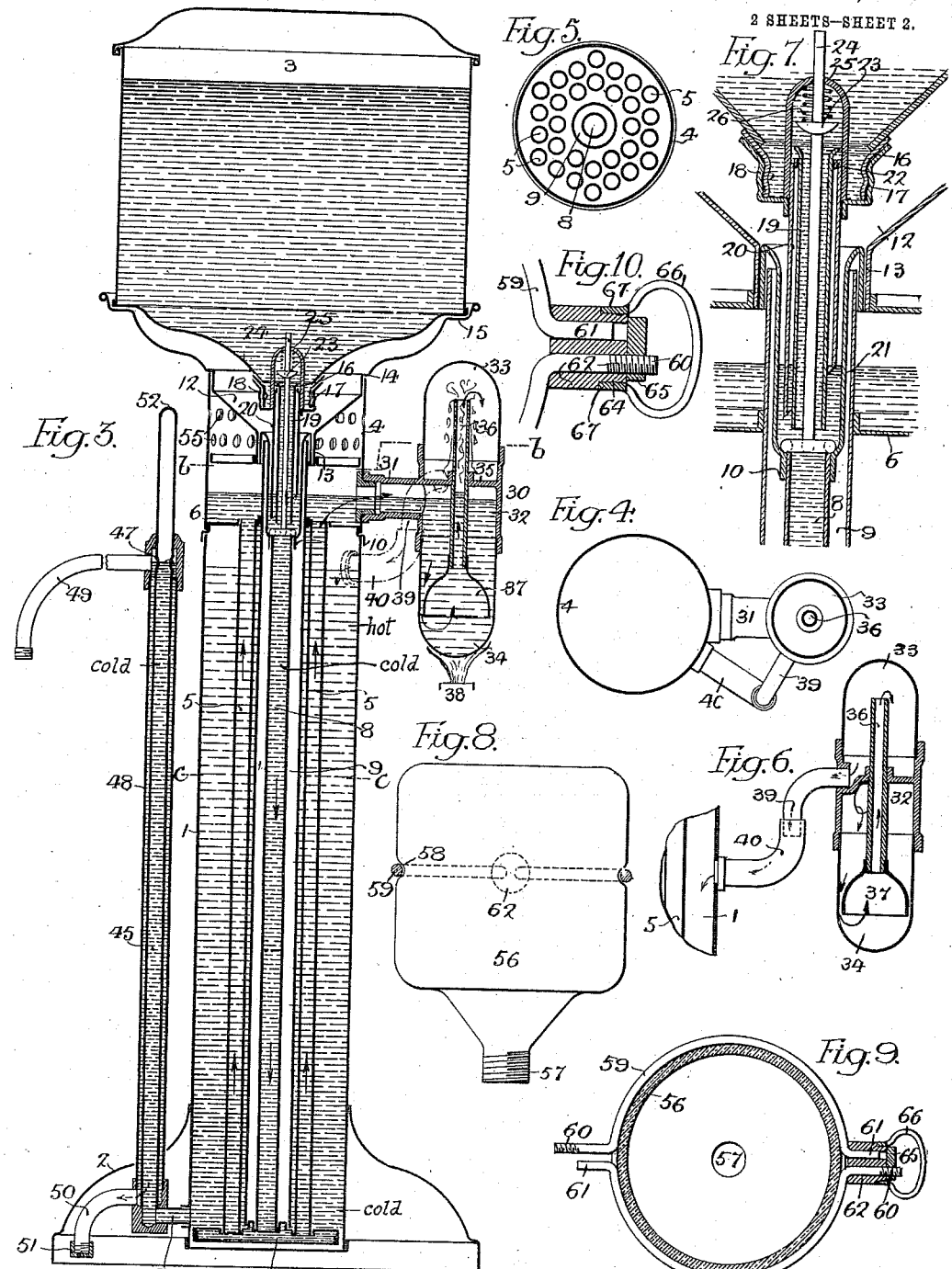
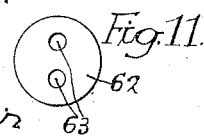

UNITED STATES PATENT OFFICE.

JOHN S. FORBES, OF PHILADELPHIA, PENNSYLVANIA.

APPARATUS FOR HEATING WATER, MILK AND OTHER LIQUIDS FOR STERILIZING OR OTHER PURPOSES.

973,270.  Specification of Letters Patent.  Patented Oct. 18, 1910.

Application filed August 10, 1908. Serial No. 447,903.

*To all whom it may concern:*

Be it known that I, JOHN S. FORBES, a citizen of the United States, residing in Philadelphia, Pennsylvania, have invented certain Improvements in Apparatus for Heating Water, Milk, and other Liquids for Sterilizing or other Purposes, of which the following is a specification.

My invention relates to certain improvements in apparatus of the type described and claimed in my prior patents No. 750,757, Jan. 26, 1904, No. 793,517, June 27, 1905 and that of A. G. Waterhouse No. 615,932, Dec. 13, 1898, for heating and sterilizing water and other liquids, and the object of my present invention is to provide a self-contained structure for carrying out the process of heating water, milk and other liquids, and for the same purpose, as disclosed in the prior patents above referred to; to provide means for insulating the initial supply of cold raw water from the raw water in the heat exchange whereby the latter raw water may extract the heat from the sterilized water, thereby cooling the latter and heating the former to the desired degree, and to provide for the separation of the raw water container from the sterile water container without the necessity of uncoupling any joints.

Other features of my invention will be described hereinafter, reference being had to the accompanying drawings, in which:

Figure 1, is a perspective view of the complete apparatus forming the subject of my invention; Fig. 2, is a perspective view of such apparatus with the parts detached; Fig. 3, is a sectional view on the line *a—a*, Fig. 1; Figs. 4 and 5, are sectional plan views on the lines *b—b* and *c—c*, Fig. 3; Fig. 6, is a sectional detached view of the water heater; Fig. 7, is an enlarged sectional view of a part of the structure shown in Fig. 3, and Figs. 8 to 12, inclusive, are views illustrating further details of my invention.

My present apparatus discloses certain improved means designed for heating and sterilizing water, based on the principle disclosed in the patents above referred to, and hence it will be unnecessary to detail such process herein, except insofar as may be necessary to fully describe the structure forming the subject of the present improvements.

In the drawings herewith, 1 represents a suitable casing mounted upon a base 2; carrying at its upper end a water receptacle 3 from which water is delivered under the well-known barometric feeding principle. Supported by the casing 1 is a shell 4 of the same diameter, from which depend a series of tubes 5; such tubes being sweated into a plate 6 at the top and also into a bottom tube sheet which with said shell forms a chamber 7 at the bottom common to all of said tubes. It will be understood that soldered or sweated connections are employed between the shell and its tube sheets as well as between the latter and the tubes, so that there is no possibility of the liquid leaking at these joints. The central tube of said series, indicated at 8, is larger than the rest, and this tube communicates directly with the water receptacle 3 on top of the structure for the passage of raw water to the bottom chamber 7 with which the other tubes 5 communicate, and in which such water rises.

The central tube 8 is surrounded by a tubular sleeve 9, the lower end of which fits over a boss pressed up from the cover of the chamber 7, while its upper end passes through the plate 6 and is connected by means of a short sleeve 10 with said tube 8; the top portion of said sleeve 9 being preferably spun over in the manner shown in Fig. 3. Mounted within the shell 4 and supporting the water receptacle is a funnel shaped member 12, having a tubular part 13 encircling said sleeve 10 and carrying a disk-like portion 14 which fits the inner wall of said shell 4; such disk-like portion forming with the plate 6 carrying the tubes 5, a chamber for the reception of water rising from said tubes. This structure 12 is provided with a seat 15 for the water receptacle.

The water receptacle is provided with a barometric feeding device, comprising a valved outlet 16, carried by a screw cap 17 and fitting over the contracted end 18 of said water receptacle; such structure being clearly shown in the enlarged view, Fig. 7. The cap 17 carries a discharge pipe 19, which is surrounded by a tube or sleeve 20, the lower end of which is beveled on the line 21; such tube being provided with a small aperture 22 at the top for the passage of air to permit the water to flow from said receptacle. The outlet or discharge pipe 19 is provided with a valve 23, having a stem 24 guided through the yoke 25. When the water receptacle is raised from its seat, the valve will be closed by a spring 26, but when such receptacle is seated, as shown in Fig. 3, the valve is lifted by the engagement of its stem with the top of the tube 8, and water will flow from the discharge pipe 19 until it reaches the level of the upper portion of the bevel of the sleeve 20.

Mounted at one side of the casing is a water heating structure 30. This comprises a tubular arm 31 communicating with the interior of the shell 4, and having a cylindrical portion 32 closed at top and bottom by the cap shells or covers 33 and 34. The portion 32 has a division wall 35 dividing the structure into two chambers, and carried by this wall is a vertical tubular stem 36, at the bottom of which is an inverted cup 37. Water overflows into the heating structure through the tubular arm 31, and heat being applied to the lower portion of the same by means of a gas burner or other suitable device as indicated at 38 in Fig. 1, causes the water to boil and pass up through the stem 36 and overflow into the upper receptacle of the heating structure, such water being the sterilized product of the apparatus. The boiling lasts but a fraction of a second, and once the water has passed through the heating structure it is removed immediately from contact with the heating medium. This short period of boiling and the subsequent rapid cooling does not drive the oxygen and palatable gases out of the water, and as a consequence water so treated has not the flat insipid and unpalatable taste invariably found in water boiled in the ordinary way.

The hot sterilized water flows via an outlet pipe 39 carried by the heating structure into an inlet pipe 40 carried by the casing 1, into the latter, and surrounds the tubes 5 disposed therein. The raw water within said tubes being cool, it immediately begins to extract heat from the sterilized water surrounding the same so that two desirable results are attained; viz., the raw water is delivered to the heating chamber within a few degrees of the boiling point, while the sterilized water is delivered to a discharge pipe at a temperature within a few degrees of the entering raw water.

To deliver the sterilized water from the casing 1, I provide a discharge pipe 45 communicating at 46 with the bottom of said casing and rising outside the latter to a point adjacent the normal level of water in the apparatus; such pipe being apertured at 47. A sleeve 48 surrounds the discharge pipe and before the sterile water can find its outlet from a spout or stem 49, it must fill said sleeve up to the apertures 47. If desired, I may provide an additional spout 50 at the lower end of said discharge pipe communicating with the space between said pipe and the sleeve so that the sterile water will have to first rise through the pipe 45 and then pass down the outside of the same. Normally the outlet spout 50 is closed by a cap 51, and if it is desired to discharge the water therefrom, the cap is removed and placed on the end of the spout 49. To prevent siphoning of the water from the discharge pipe through the spout 49, the upper end of said pipe is apertured at 52.

The purpose of the tubular sleeve 9 surrounding the tube 8 supplying the initial volume of raw water for ascension through the tubes 5, is to insulate such water from the heated sterilized water surrounding said tubes in order that the exchange of heat between said two bodies of water may take place under conditions such as will insure the maximum efficiency of operation. As the water rises in these tubes it extracts heat from the sterile water as before described, thereby cooling the sterile water for delivery and heating the raw water at the top of said tubes within a few degrees of that within the heating structure; greatly facilitating the sterilizing process.

The space between the tube 8 and its sleeve 9 is filled with dead air, which if heated may leak at the top around the upper sleeve 10 connecting said tube 8 and sleeve 9; and it is to be noted that said sleeve 10 and the tube 8 with its sleeve, are free to expand and contract independently of each other, inasmuch as their upper ends, as shown in the drawings, are not rigidly connected. The shell 4 is perforated at 55, as clearly shown in the drawing, permitting the ingress of air to circulate around the feeding device through which raw water flows from the receptacle 3.

The insulation of the initial supply or descending column of raw water together with the fact that my structure is not only self-contained but also separable for the purpose of cleansing, constitute the important features of my invention. It will be further noted that the separation of the raw water compartment or container from the sterile water compartment may be accomplished without the necessity of disconnecting any screwed or other form of joint, it being understood, however, that all permanently assembled parts such as the tubes and tube sheets are connected by soldering in order to prevent any possible leakage of raw liquid into portions of the apparatus designed for the reception of sterilized liquid.

In Figs. 1, 2 et seq., I have shown a metal water receptacle arranged to feed under the barometric principle as shown, but it will be understood that I do not wish to be limited to such construction. If desired, I may use a glass bottle, and in Fig. 8, I have shown such form of bottle, indicated at 56 and having a threaded neck 57 to receive the screw cap 17 of the barometric feeding device. This bottle will be grooved at 58 and lifting means will be provided in the form of bent wires or rods 59 which encircle the bottle and lie in said grooves, each of said rods having a threaded end 60 and a plain end 61. Over these ends, which are brought together, I slip a collar 62 having two apertures 63 for said ends and having an externally threaded portion 64. I then apply an eccentric nut 65 to the threaded end of each rod and dispose the same as clearly shown in the sectional view, Fig. 10, after which a handle 66 with a threaded portion 67 is applied to said collar.

As the water is boiled out of the heating structure 30, the level of water therein is lowered and likewise the level of the water in the chamber within the shell 4. This causes more water to pass through the barometric feeding device and restores the water in the chamber of the shell 4 and tubular arm communicating with the heating device to the normal level. This action becomes continuous, for the flame of the burner 38 is continually boiling water in the heating structure 30, and causing it to rise and flow through the stem 36. The water boiling through the stem 36 fills the casing 1, and when such casing is filled, the sterile water passes through the discharge pipe 45 and spout 49 and is caught and stored in a proper receptacle. While passing down through the casing 1, the heat of the water, which is boiling hot, is transferred by conduction, through the walls of the tubes 5 to the cold raw water passing up through the same so that the water which is boiled in the heating structure 30, passes out of the apparatus nearly as cold as that entering, while the cold water entering the apparatus becomes heated in passing up through the tubes 5, and reaches the heating structure in a very hot condition and nearly at the boiling point. Therefore, the only heat which has to be supplied to keep the apparatus running continuously, is that required to bring the already highly heated water entering the heating structure to the boiling point, and thereby cause it to rise above the normal level therein and pass on through the stem 36 and so through the remainder of the apparatus to the discharge pipe 45 and spout 49.

Although I have referred to water as the liquid treated in my improved apparatus, it will be understood that it is capable of treating any liquid that may be sterilized by heating.

I claim:

1. In a liquid heater or sterilizer, a liquid containing casing having a weir placed to normally prevent the flow of liquid through the apparatus, means for applying heat to the apparatus to cause liquid to be sterilized and pass over said weir, a heat exchange having a portion removable from the casing, a liquid supply pipe passing through said removable portion, and means for insulating said supply pipe from the heated liquid within the heat exchange.

2. The combination of a casing, a body of tubes forming a heat exchange fitting within said casing and removable therefrom, means for supplying cold liquid to said tubes, means for heating the liquid, the parts being connected to cause said liquid to descend in one of said tubes and ascend in the others, means for introducing the heated liquid around the tubes, and a casing for insulating the descending column of cold water from the liquid in the remainder of the heat exchange.

3. The combination in a sterilizer of a casing, a weir placed to normally prevent passage of liquid through the apparatus, and including liquid containing structures on the two sides of the weir, a heat exchange in connection with said liquid containing structures, a funnel shaped structure removably carried by the casing, a container for raw liquid supported by said funnel shaped structure above the weir and in connection with the raw liquid side of the heat exchange; and a barometric feed governing device for regulating the supply of liquid from said container; with means for heating the liquid to cause it to pass over the weir.

4. In an apparatus of the character described, the combination of a casing, a series of tubes therein for the ascension of raw water, a central delivery tube for raw water, a shell carrying said tubes, a raw water receptacle, a barometric feeding device delivering the water therefrom to said central tube, a support for the raw water receptacle fitting the shell carrying the raw water tubes, and means providing for a circulation of air around said water feeding device.

5. In an apparatus of the character described, the combination of a casing for the sterile water, a removable shell fitting the upper end of said casing and carrying a series of raw water tubes, an insulated delivery tube for raw water centrally disposed with respect to said tubes and also carried by said shell, a dished cover fitting the upper end of said shell, said cover having a bottom which forms with the upper tube sheet a chamber for the raw water delivered by said tubes, a water receptacle delivering water to said central tube, a heating device to which the raw water is delivered, means for passing the heated and sterilized water to the casing to surround the raw water tubes, and a discharge pipe for the sterile water.

6. In a liquid heater or sterilizer; the combination of a heat exchange; a weir for normally preventing the flow of liquid through a part of said exchange; heating means for sterilizing liquid and causing it to flow over the weir; a tube passing substantially centrally through said heat exchange directly to the bottom thereof; a shell surrounding and spaced apart from said tube so as to insulate the liquid therein from the heated liquid in the heat exchange; a container for raw liquid connected to discharge into said tubes; and means for supporting said container symmetrically over said heat exchange.

7. The combination of a liquid sterilizing device; a casing for receiving the heated sterile liquid; a container for raw liquid disposed above said casing and removable therefrom, a barometric feeding device for supplying liquid from the raw liquid container; and a valve for said feeding device constructed to be held open only when the liquid container is mounted in place.

8. The combination in a sterilizer of a casing having a removable heat exchange element including a closed box; tubes entering the same; and a tube sheet receiving the free ends of the tubes; means for raising liquid to a sterilizing temperature; and means for supplying raw liquid to the apparatus.

9. The combination in a sterilizer of a heat exchange having a casing; two tube sheets; tubes rigidly connected to and extending between said tube sheets; one of said tubes being prolonged beyond one of the sheets; a tube rigidly connected to one tube sheet and extending loosely through the other sheet within said prolonged tube; with means for supplying liquid at different temperatures to the compartments formed by the casing and the tubes.

10. The combination in a sterilizer of a heat exchange having a casing; two tube sheets; tubes rigidly connected to and extending between said tube sheets; one of said tubes being prolonged beyond one of the sheets; a tube rigidly connected to one tube sheet and extending loosely through the other sheet within said prolonged tube; said inner tube having its free end turned over and back around the end of the prolonged tube.

11. The combination of a casing; a removable heat exchange element including a shell fitting over the top of said casing; a series of tubes entering said shell; and a closed box also receiving said tubes; a source of liquid supply connected through one of said tubes with said closed box; and a liquid heating device connected to the shell.

12. The combination in a structure of a casing; a heat exchange element including a series of tubes removably mounted in said casing; a weir having liquid heating means and removable with said tubes; with means for supplying liquid to the weir and to the heat exchange.

13. The combination in a sterilizer of a heat exchange including an open topped shell; a casing; and a series of tubes of which one projects upwardly from the bottom of said shell; a weir having one side connected to the interior of the shell and its other side to the interior of the casing; with a funnel shaped cover for the shell having a part fitting the projecting tube; and a liquid container mounted on said cover.

14. The combination in a sterilizer of an upwardly extending casing; a shell mounted on the top of the same; a closed box at the bottom of the casing; a series of tubes connecting the shell and said box and removable with the box and shell from the casing; a source of raw liquid; a feed controlling device operative between said source and one of the tubes; a weir having one side connected to the interior of the shell and its other side connected to the interior of the casing; with means for heating liquid to cause it to pass over said weir.

15. The combination in a sterilizer of means for heating water to the sterilizing point including a heat exchange; an open conduit leading to said heat exchange; a raw liquid container; a removable discharge pipe for said container; and means for supporting said container with the lower end of said pipe immersed in liquid in said open conduit, to provide a barometric feeding device.

In testimony whereof, I have signed my name to this specification, in the presence of two subscribing witnesses.

JOHN S. FORBES.

Witnesses:
MURRAY C. BOYER,
JOS. H. KLEIN.